(12) United States Patent
Yamagata

(10) Patent No.: US 12,249,198 B2
(45) Date of Patent: Mar. 11, 2025

(54) DETERIORATION ESTIMATION DEVICE, METHOD, SOLAR SYSTEM, AND VEHICLE

(71) Applicant: TOYOTA JIDOSHA KABUSHIKI KAISHA, Toyota (JP)

(72) Inventor: Akihiro Yamagata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 18/067,850

(22) Filed: Dec. 19, 2022

(65) Prior Publication Data
US 2023/0260340 A1     Aug. 17, 2023

(30) Foreign Application Priority Data
Feb. 16, 2022   (JP) ................. 2022-022353

(51) Int. Cl.
| | | |
|---|---|---|
| G07C 5/08 | (2006.01) |
| B60L 3/00 | (2019.01) |
| B60L 8/00 | (2006.01) |
| B60L 58/16 | (2019.01) |
| H01M 10/42 | (2006.01) |
| H01M 10/48 | (2006.01) |

(52) U.S. Cl.
CPC .......... *G07C 5/0816* (2013.01); *B60L 3/0084* (2013.01); *B60L 8/003* (2013.01); *H01M 10/425* (2013.01); *H01M 10/486* (2013.01); *B60L 58/16* (2019.02); *H01M 2010/4278* (2013.01); *H01M 2220/20* (2013.01)

(58) Field of Classification Search
None
See application file for complete search history.

(56) References Cited

U.S. PATENT DOCUMENTS 10,399,442 B2 * 9/2019 Harada ................. B60L 53/22
10,505,240 B1 * 12/2019 Bruce ................ H01L 31/0525

FOREIGN PATENT DOCUMENTS

| JP | 2009292249 A | 12/2009 |
| JP | 2010100141 A | 5/2010 |
| JP | 2011247785 A | 12/2011 |
| JP | 2016159766 A | 9/2016 |
| JP | 2019100971 A | 6/2019 |

* cited by examiner

*Primary Examiner* — Todd Melton
(74) *Attorney, Agent, or Firm* — Dickinson Wright, PLLC

(57) ABSTRACT

A deterioration estimation device that is provided in an in-vehicle component (such as an ECU) mounted in a vehicle includes a processor, and the processor is configured to acquire information about a temperature variation of the in-vehicle component based on electric power generated by a solar panel mounted in the vehicle, and estimate deterioration of the in-vehicle component based on the acquired information about the temperature variation of the in-vehicle component.

7 Claims, 6 Drawing Sheets

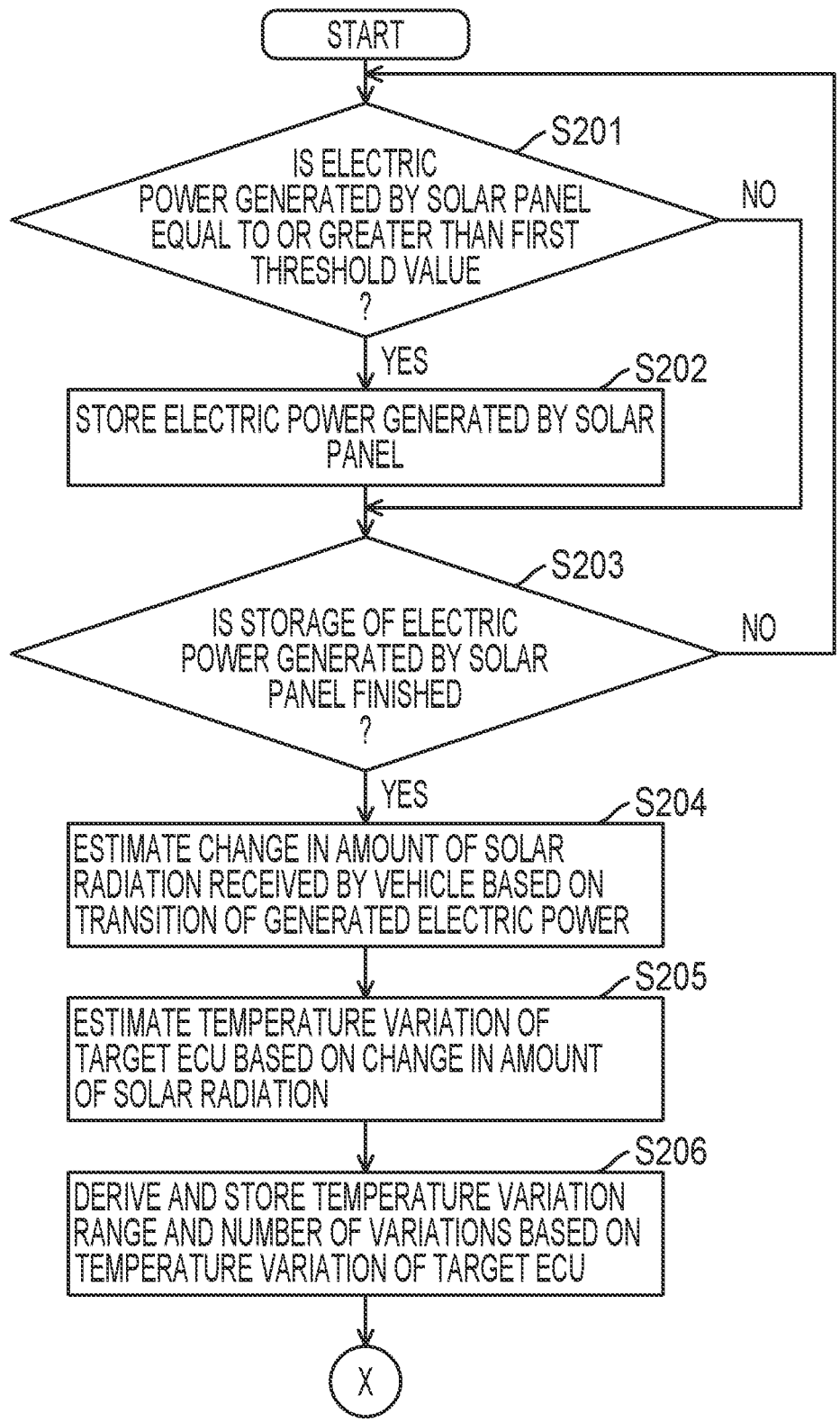

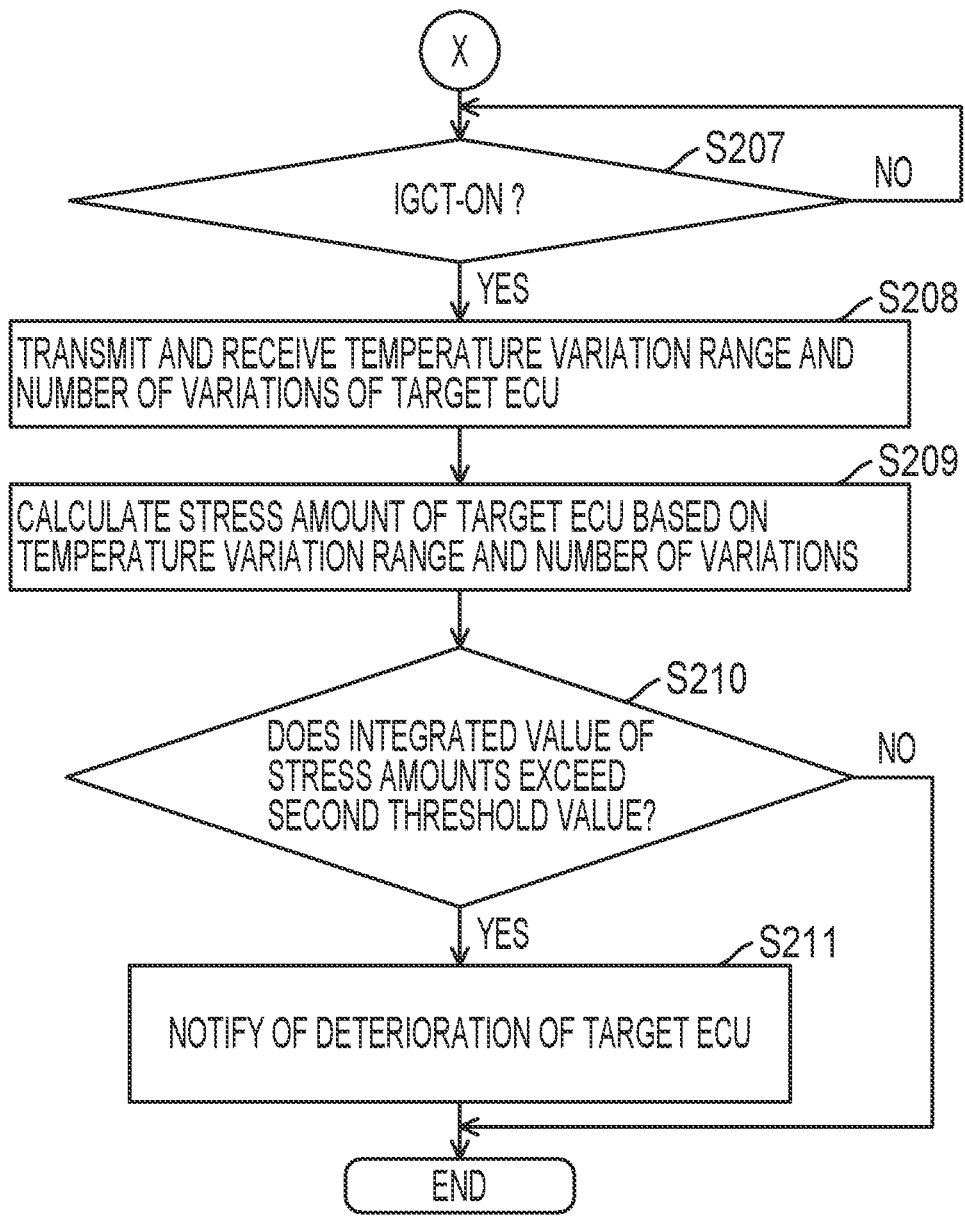

FIG. 7

| SECTION | ΔT1 | ΔT2 | ΔT3 | ΔT4 |
|---|---|---|---|---|
| TEMPERATURE VARIATION RANGE | $0 < \Delta T \leq 5$ | $5 < \Delta T \leq 10$ | $10 < \Delta T \leq 15$ | $15 < \Delta T$ |
| NUMBER OF VARIATIONS | 21 | 13 | 8 | 3 |
| AVERAGE TEMPERATURE | 4.1 | 7.6 | 13.8 | 19.1 |

DETERIORATION ESTIMATION DEVICE, METHOD, SOLAR SYSTEM, AND VEHICLE

CROSS-REFERENCE TO RELATED APPLICATION

This application claims priority to Japanese Patent Application No. 2022-022353 filed on Feb. 16, 2022, incorporated herein by reference in its entirety.

BACKGROUND

1. Technical Field

The present disclosure relates to a deterioration estimation device, a method, a solar system, and a vehicle for estimating deterioration of in-vehicle components using electric power generated by a solar panel mounted in the vehicle.

2. Description of Related Art

Japanese Unexamined Patent Application Publication No. 2019-100971 (JP 2019-100971 A) discloses a battery deterioration estimation device capable of estimating the amount of deterioration of a battery with high precision by estimating the transition of temperature of the battery using data on the outside air temperature and data on the solar radiation intensity.

SUMMARY

From the viewpoint of reducing energy consumption, in the battery deterioration estimation device described in JP 2019-100971 A, the deterioration estimation device is activated at intervals of 10 minutes to acquire data needed to determine the deterioration state of the battery. However, in order to more precisely estimate deterioration of an in-vehicle component such as the battery and an electronic control unit (ECU), it is desirable to acquire a large amount of data (solar radiation data or the like) needed to determine the deterioration state with accuracy.

The present disclosure provides a deterioration estimation device and the like that can precisely acquire a large amount of data needed to determine a deterioration state and estimate deterioration of an in-vehicle component with higher precision.

A first aspect of the present disclosure relates to a deterioration estimation device that is provided in an in-vehicle component mounted in a vehicle. The deterioration estimation device includes a processor. The processor is configured to acquire information about a temperature variation of the in-vehicle component based on electric power generated by a solar panel mounted in the vehicle, and estimate deterioration of the in-vehicle component based on the acquired information about the temperature variation of the in-vehicle component.

In the first aspect, the information about the temperature variation of the in-vehicle component may be based on an amount of solar radiation with which the vehicle is irradiated, the amount of solar radiation being estimated from the electric power generated by the solar panel.

In the first aspect, the information about the temperature variation of the in-vehicle component may be based on a temperature at a position in the vehicle where the in-vehicle component is mounted, the temperature being estimated from the amount of solar radiation with which the vehicle is irradiated.

In the first aspect, the information about the temperature variation of the in-vehicle component may be a temperature variation range and the number of temperature variations of the in-vehicle component, the temperature variation range and the number of the temperature variations being derived from the temperature at the position in the vehicle where the in-vehicle component is mounted.

In the first aspect, the processor may be configured to estimate deterioration of the in-vehicle component based on at least one of an outside air temperature of the vehicle, exhaust heat from components mounted around the in-vehicle component, and self-heating of the in-vehicle component, in addition to the temperature variation range and the number of the temperature variations of the in-vehicle component.

In the first aspect, the processor may be configured to give a notification when the estimated state of deterioration becomes a predetermined state.

A second aspect of the present disclosure relates to a solar system that is mounted in a vehicle. The solar system includes a solar panel, a first in-vehicle component, and a second in-vehicle component. The first in-vehicle component controls electric power generated by the solar panel, and the second in-vehicle component receives information about a temperature variation from the first in-vehicle component. The first in-vehicle component is configured to measure the electric power generated by the solar panel, estimate a temperature variation of the second in-vehicle component based on the measured electric power generated by the solar panel, and transmit information about the estimated temperature variation of the second in-vehicle component to the second in-vehicle component. The second in-vehicle component is configured to receive the information about the temperature variation of the second in-vehicle component from the first in-vehicle component, and estimate deterioration of the second in-vehicle component based on the received information about the temperature variation of the second in-vehicle component.

In the second aspect, the first in-vehicle component may be configured to estimate an amount of solar radiation with which the vehicle is irradiated from the electric power generated by the solar panel, estimate a temperature at a position in the vehicle where the second in-vehicle component is mounted from the amount of solar radiation with which the vehicle is irradiated, and derive a temperature variation range and the number of the temperature variations of the second in-vehicle component from the temperature at the position in the vehicle where the second in-vehicle component is mounted.

A third aspect of the present disclosure relates to a vehicle that is equipped with the solar system.

A fourth aspect of the present disclosure relates to a method that is executed by a computer of an in-vehicle component mounted in a vehicle. The method includes acquiring information about a temperature variation of the in-vehicle component based on electric power generated by a solar panel mounted in the vehicle, and estimating deterioration of the in-vehicle component based on the acquired information about the temperature variation of the in-vehicle component.

A fifth aspect of the present disclosure relates to a non-transitory storage medium storing instructions. The instructions are executable by one or more processors of in-vehicle components mounted in a vehicle and cause the one or more processors to perform the following functions. The functions include acquiring information about a temperature variation of the in-vehicle component based on electric power generated by a solar panel mounted in the vehicle, and estimating deterioration of the in-vehicle component based on the acquired information about the temperature variation of the in-vehicle component.

With the deterioration estimation device and the like of the present disclosure, it is possible to accurately acquire a large amount of data needed to determine the state of deterioration based on electric power generated by a solar panel, which can estimate the deterioration of an in-vehicle component such as an ECU with higher precision.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a flowchart of a deterioration estimation process of a target ECU executed by the solar system;

FIG. 2B is a flowchart of the deterioration estimation process of the target ECU executed by the solar system;

FIG. 7 shows an example of a correspondence table between the temperature variation range and the number of the temperature variations of the target ECU.

DETAILED DESCRIPTION OF EMBODIMENTS

In a solar system according to the present disclosure, a solar electronic control unit (ECU) (first in-vehicle component) estimates a temperature variation of a target ECU (second in-vehicle component) that is one of target in-vehicle components, based on electric power generated by a solar panel. Then, the target ECU estimates deterioration of the target ECU itself based on information about a temperature variation which is acquired from the solar ECU. In this way, it is possible to accurately acquire a large amount of data needed to determine the state of deterioration based on the electric power generated by the solar panel, which is acquired by the solar ECU, and thus it is possible for the target ECU to estimate the deterioration of the target ECU itself with higher precision based on the data.

Hereinafter, an embodiment of the present disclosure will be described in detail with reference to the drawings.

EMBODIMENT

Configuration

Figure 1:
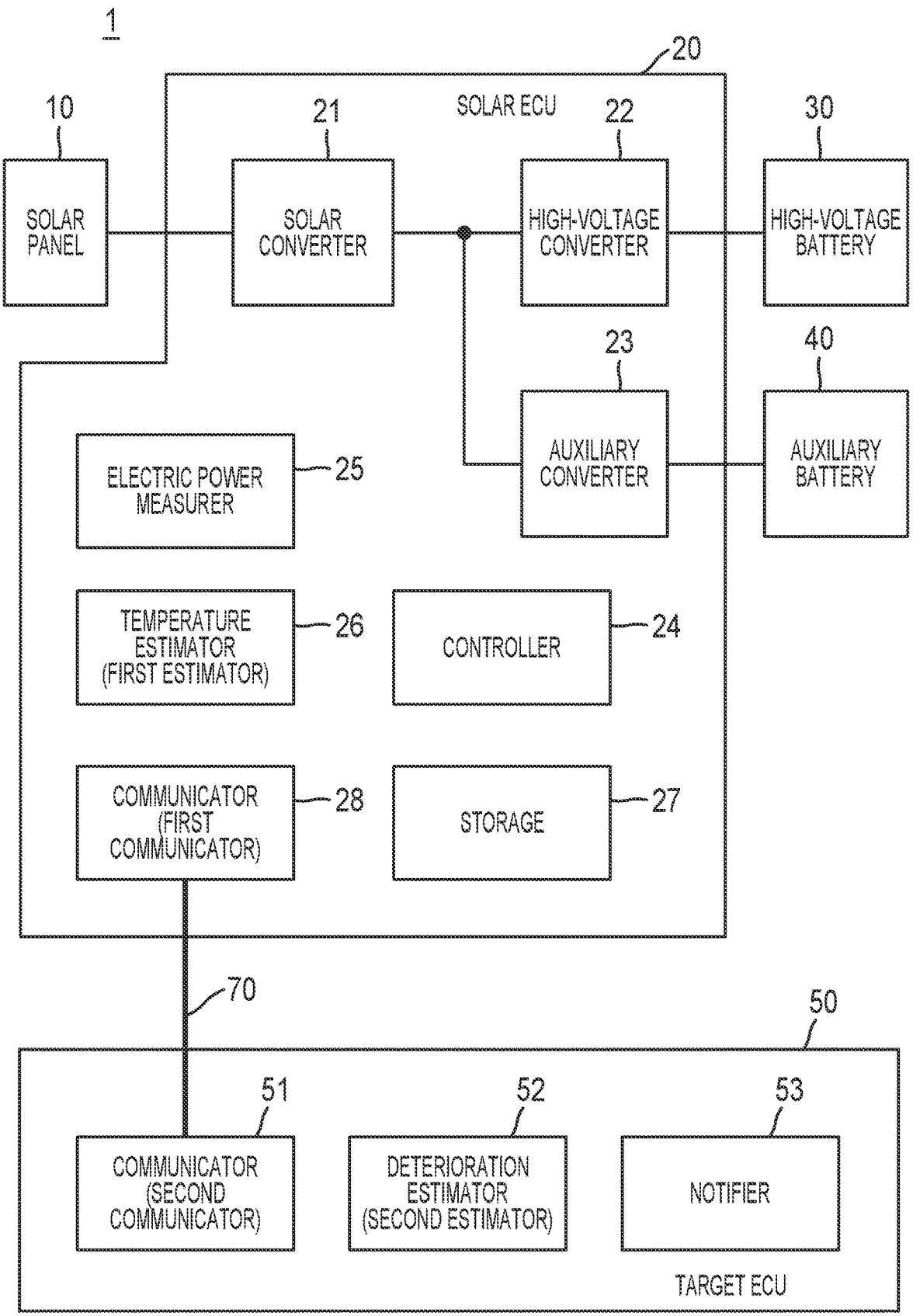
FIG. 1 is a block diagram showing a schematic configuration of a solar system according to the present embodiment.

FIG. 1 is a block diagram showing a schematic configuration example of a solar system 1 according to an embodiment of the present disclosure. The solar system 1 illustrated in FIG. 1 includes a solar panel 10, a solar ECU 20, a high-voltage battery 30, an auxiliary battery 40, and a target ECU 50. The solar ECU 20 and the target ECU 50 are communicably connected to each other through a communication bus 70 such as a controller area network (CAN). The number of the target ECUs 50 connected to solar ECU 20 through the communication bus 70 may be two or more. The solar system 1 can be mounted in a vehicle or the like. Each of the solar ECU 20 and the target ECU 50 includes a processor.

The solar panel 10 is an electric power generator that generates electric power by receiving emitted sunlight, and is typically a solar cell module that is an assembly of solar cells. The solar panel 10 can be installed, for example, on the roof of the vehicle. The solar panel 10 is connected to the solar ECU 20, and the electric power generated by the solar panel 10 is output to the solar ECU 20. The electric power generated by the solar panel 10 depends on the amount of solar radiation (solar radiation intensity or the like) received by the panel.

The solar ECU 20 is an in-vehicle component mounted in the vehicle, and is an electronic control unit (first ECU) that controls the charge of the high-voltage battery 30 and/or the auxiliary battery 40 using the electric power generated by the solar panel 10. The solar ECU 20 can estimate the temperature variation of the target ECU 50 based on the electric power generated by the solar panel 10. The solar ECU 20 includes a solar converter 21, a high-voltage converter 22, an auxiliary converter 23, a controller 24, an electric power measurer 25, a temperature estimator 26, a storage 27, and a communicator 28.

The solar converter 21 is a direct current-direct current (DCDC) converter for supplying electric power generated by the solar panel 10 to the high-voltage converter 22 and/or the auxiliary converter 23. The solar converter 21 can convert (step up/step down) the voltage generated by the solar panel 10, which is an input voltage in supplying electric power, to a predetermined voltage based on an instruction from the controller 24 and output the converted voltage to the high-voltage converter 22 and the auxiliary converter 23.

The high-voltage converter 22 is a DCDC converter for supplying the electric power output from the solar converter 21 to the high-voltage battery 30. The high-voltage converter 22 can convert (step up) the output voltage of the solar converter 21, which is an input voltage in supplying electric power, to a predetermined voltage based on an instruction from the controller 24, and output the converted voltage to the high-voltage battery 30.

The auxiliary converter 23 is a DCDC converter for supplying electric power output from solar converter 21 to the auxiliary battery 40. The auxiliary converter 23 can convert (step down) the output voltage of the solar converter 21, which is the input voltage in supplying electric power, to a predetermined voltage a based on an instruction from the controller 24, and output the converted voltage to the auxiliary battery 40.

The controller 24 instructs the solar converter 21, the high-voltage converter 22, and the auxiliary converter 23 to perform power conversion to control the high-voltage battery 30 and/or the auxiliary battery 40 to be charged with the electric power generated by the solar panel 10.

The electric power measurer 25 measures the electric power generated by the solar panel 10. Specifically, the electric power measurer 25 detects each of the voltage output from the solar panel 10 to the solar converter 21 according to the generated electric power, that is, the input voltage of the solar converter 21, and the current flowing from the solar panel 10 to the solar converter 21 according to the generated electric power, that is, the input current of the solar converter 21, and obtains the electric power generated by the solar panel 10 from the input voltage and input current values.

The temperature estimator 26 is a configuration (first estimator) for estimating a temperature variation of the target ECU 50 based on the electric power generated by the solar panel 10 which is measured by the electric power measurer 25. The temperature estimator 26 performs a first process of estimating the amount of solar radiation with which the vehicle is irradiated from the electric power generated by the solar panel 10, a second process of estimating a temperature at a position in the vehicle where the target ECU 50 is mounted from the amount of solar radiation with which the vehicle is irradiated, and a third process of deriving a temperature variation range and the number of the temperature variations of the target ECU 50 from the temperature at the position in the vehicle where the target ECU 50 is mounted. The processes will be described later. When a plurality of target ECUs 50 is connected to the solar ECU 20, each of the processes is performed for each of the target ECUs 50.

The storage 27 is storage means such as a random access memory (RAM), and can record information about the electric power measured by the electric power measurer 25 and the temperature variation of the target ECU 50 obtained by each process of the temperature estimator 26.

The communicator 28 is a configuration (first communicator) for transmitting the information about the temperature variation of the target ECU 50, which is estimated by the temperature estimator 26 (or stored in the storage 27) to the target ECU 50 through the communication bus 70. When the target ECUs 50 are connected to the solar ECU 20, the communicator 28 transmits information about the temperature variation estimated for each target ECU 50 to the corresponding target ECU 50.

The target ECU 50 is an in-vehicle component mounted in the vehicle, and is an electronic control unit (second ECU) that executes predetermined control on the vehicle. The target ECU 50 can estimate the target ECU's own deterioration based on the information about the temperature variation acquired from the solar ECU 20. The target ECU 50 functions as a deterioration estimation device. The target ECU 50 includes a communicator 51, a deterioration estimator 52, and a notifier 53. For the target ECU 50, a processor is provided, and the processor functions as the communicator 51, the deterioration estimator 52, and the notifier 53.

The communicator 51 is a configuration (second communicator) for receiving the information about the temperature variation of the target ECU 50 from the solar ECU 20 (or the communicator 28 thereof) through the communication bus 70. The communicator 51 functions as an acquirer that acquires the information about the temperature variation of the target ECU 50.

The deterioration estimator 52 is a deterioration estimation device (second estimator) capable of estimating the deterioration of the target ECU 50 based on the information about the temperature variation of the target ECU 50 received by the communicator 51. The estimation of deterioration of the target ECU 50 made by the deterioration estimator 52 will be described later.

The notifier 53 gives a notification of, for example, a diagnosis when the state of deterioration of the target ECU 50 estimated by the deterioration estimator 52 is in a predetermined state. The state of deterioration of the target ECU 50 and the predetermined state that serves as a determination criterion for the notification will be described later.

The high-voltage battery 30 is a rechargeable secondary battery, for example, a lithium ion battery or a nickel metal hydride battery. The high-voltage battery 30 is connected to the high-voltage converter 22 to be charged with the electric power output by the high-voltage converter 22. As the high-voltage battery 30 mounted in the vehicle, a so-called drive battery may be exemplified that can supply electric power needed for the operation of main equipment (not shown) for driving the vehicle, such as a starter motor and an electric motor.

The auxiliary battery 40 is a rechargeable secondary battery, for example, a lithium ion battery or a lead-acid battery. The auxiliary battery 40 is connected to the auxiliary converter 23 to be charged with the electric power output by the auxiliary converter 23. The auxiliary battery 40 mounted in the vehicle is a battery that can supply electric power needed for the operation of auxiliary equipment (not shown) other than the equipment for driving the vehicle, such as lights such as headlamps and interior lights, air conditioners such as heaters and coolers, or autonomous driving and advanced driving assistance devices.

Some or all of the solar ECU 20 and the target ECU 50 can typically be built of a microcomputer including a processor, memory, input/output interface, and the like. With the structure, the processor can read and execute programs stored in the memory, thereby controlling various functions described above.

Control

Next, control by the solar system 1 according to the present embodiment will be described with further reference to FIGS. 2A and 2B. FIGS. 2A and 2B are flowcharts for describing a deterioration estimation process of the target ECU 50 executed in the solar system 1. The process in FIG. 2A and the process in FIG. 2B are connected by a connector X.

The deterioration estimation process of the target ECU 50 shown in FIGS. 2A and 2B is started at a timing when it is expected that the vehicle will continue to receive solar radiation. An example of the timing is the time of sunrise.

Some vehicles may execute control to periodically repeat a sleep mode that suspends some functions of the solar ECU 20 to suppress consumption of each battery when the ignition of the vehicle is turned off (the integrated gate-commutated thyristor (IGCT)-OFF state) and a wake-up mode that activates all the functions of the solar ECU 20. In the case of a vehicle in which such control is executed, the deterioration estimation process of the target ECU 50 is started after the timing at which the vehicle is expected to receive solar radiation and each time the solar ECU 20 enters the wake-up mode.

Step S201

The electric power measurer 25 of the solar ECU 20 determines whether or not the electric power generated by the solar panel 10 (input electric power of the solar converter 21) is equal to or greater than a first threshold value. The determination is made to check whether or not the solar panel 10 is receiving solar radiation that can generate electric power. In the present embodiment, control is executed such that the electric power for the solar ECU 20 to perform the temperature estimation process is covered just by the electric power generated by the solar panel 10 without being supplied from the high-voltage battery 30 or the auxiliary battery 40. Therefore, the first threshold value is set to be equal to or greater than the power consumption needed for the solar ECU 20 to execute the temperature estimation process.

When the electric power measurer 25 determines that the electric power generated by the solar panel 10 is greater than or equal to the first threshold value (Yes in step S201), the process proceeds to step S202. On the other hand, when the electric power measurer 25 determines that the electric power generated by the solar panel 10 is less than the first threshold value (No in step S201), the process proceeds to step S203.

Step S202

The electric power measurer 25 of the solar ECU 20 stores (records) the measured electric power generated by the solar panel 10 (input electric power of the solar converter 21) in the storage 27 or the like. When the electric power generated by the solar panel 10 is stored by the electric power measurer 25, the process proceeds to step S203.

Step S203

The electric power measurer 25 of the solar ECU 20 determines whether or not to finish storing (recording) the electric power generated by the solar panel 10 (input electric power of the solar converter 21). Specifically, the electric power measurer 25 determines the timing at which it is expected that solar radiation for the vehicle does not continue. An example of the timing is the time of sunset. The timing may be determined based on time information given from a vehicle or the like, or may be determined based on the expected electric power to be generated by the solar panel 10 after sunset.

When the electric power measurer 25 determines that the storage of the electric power generated by the solar panel 10 is finished (Yes in step S203), the process proceeds to step S204. On the other hand, when the electric power measurer 25 determines that the storage of the electric power generated by the solar panel 10 is not finished (No in step S203), the process proceeds to step S201.

Figure 3:
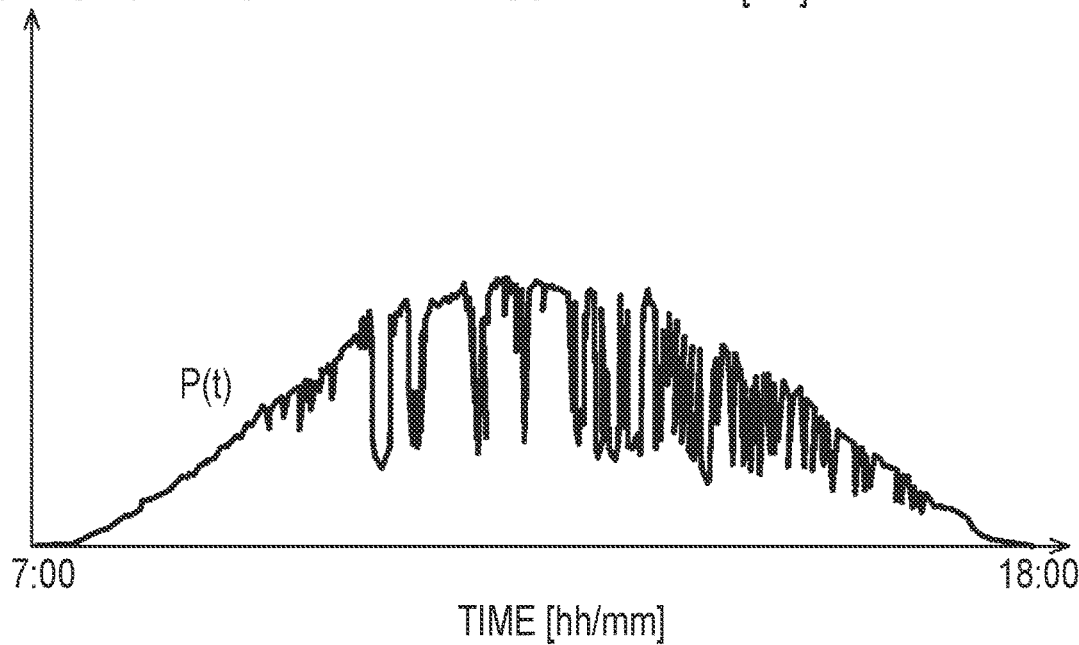
FIG. 3 is a graph of an example of a transition of electric power generated by the solar panel.

By repeatedly executing the process from step S201 to step S203 described above, it is possible to acquire (store) the transition of the electric power generated by the solar panel 10 from the start of measurement to the end of measurement. FIG. 3 shows an example of transition of the electric power P(t) [Wh] generated by the solar panel 10 from sunrise time 7:00 to sunset time 18:00 acquired (stored) by the electric power measurer 25.

Step S204

The temperature estimator 26 of the solar ECU 20 estimates a change in the amount of solar radiation received by the vehicle based on the transition of the electric power generated by the solar panel 10 acquired by the electric power measurer 25. An estimated amount of solar radiation R(t) received by the vehicle is obtained from the electric power P(t) generated by the solar panel 10 by the following equation [1], by using a curvature r of the solar panel 10 and an efficiency η of the solar converter 21.

$$R(t)=P(t) \times r \times \eta \quad [1]$$

Figure 4:
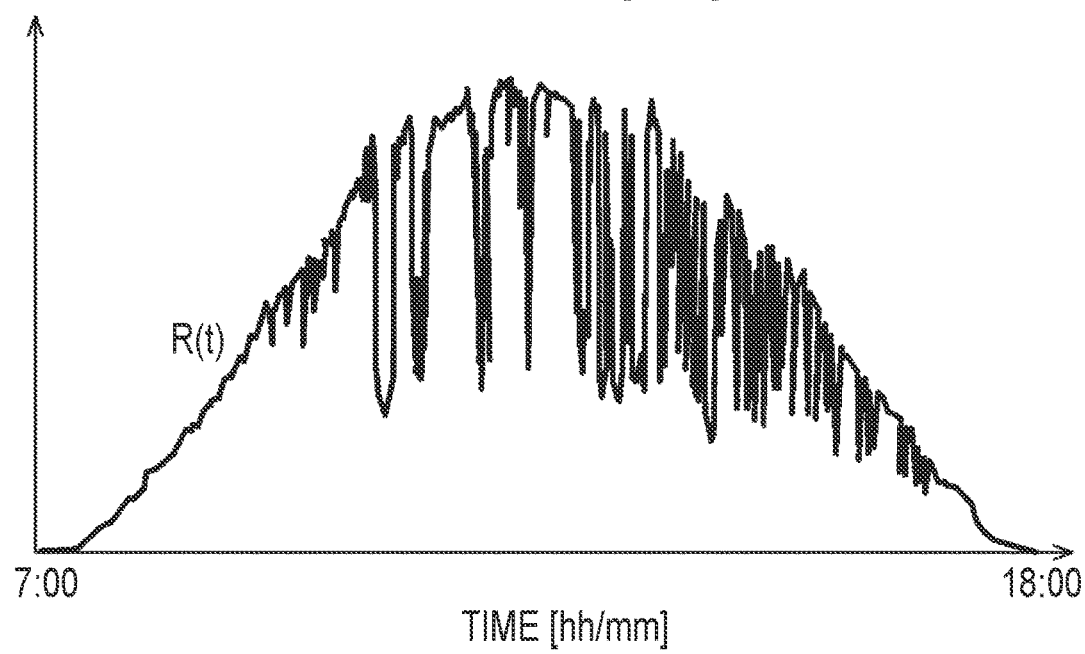
FIG. 4 is a graph of an example of a change in the amount of solar radiation received by a vehicle.

FIG. 4 shows an example of the transition of the estimated amount of solar radiation R(t) [W/m²] received by the vehicle from sunrise time 7:00 to sunset time 18:00, which is estimated by the temperature estimator 26. When the temperature estimator 26 estimates the change in the estimated amount of solar radiation received by the vehicle, the process proceeds to step S205.

Step S205

The temperature estimator 26 of the solar ECU 20 estimates the temperature variation of the target ECU 50 based on the change in the estimated amount of solar radiation received by the vehicle. The temperature variation ΔT(t) of the target ECU 50 is obtained from the estimated amount of solar radiation R(t) received by the vehicle by the following equation [2], by using a temperature distribution function L preset for the position in the vehicle where the target ECU 50 is mounted, an airtight coefficient a preset according to the type of vehicle, and a coefficient c for converting the solar radiation to temperature.

$$\Delta T(t)=R(t) \times L \times a \times c \quad [2]$$

Regarding the position in the vehicle where the target ECU 50 is mounted, a plurality of areas is defined in advance, for example, an area in front of an engine compartment, an upper rear area of the engine compartment, a lower rear area of the engine compartment, a dashboard area, a front wheel area, and a rear wheel area. The temperature distribution function L is set for each of the areas. When there are the target ECUs 50, the estimated amount of solar radiation R(t) received by the vehicle at the position in the vehicle where each target ECU 50 is mounted is calculated by using the temperature distribution function L of the area corresponding to the position.

Figure 5:
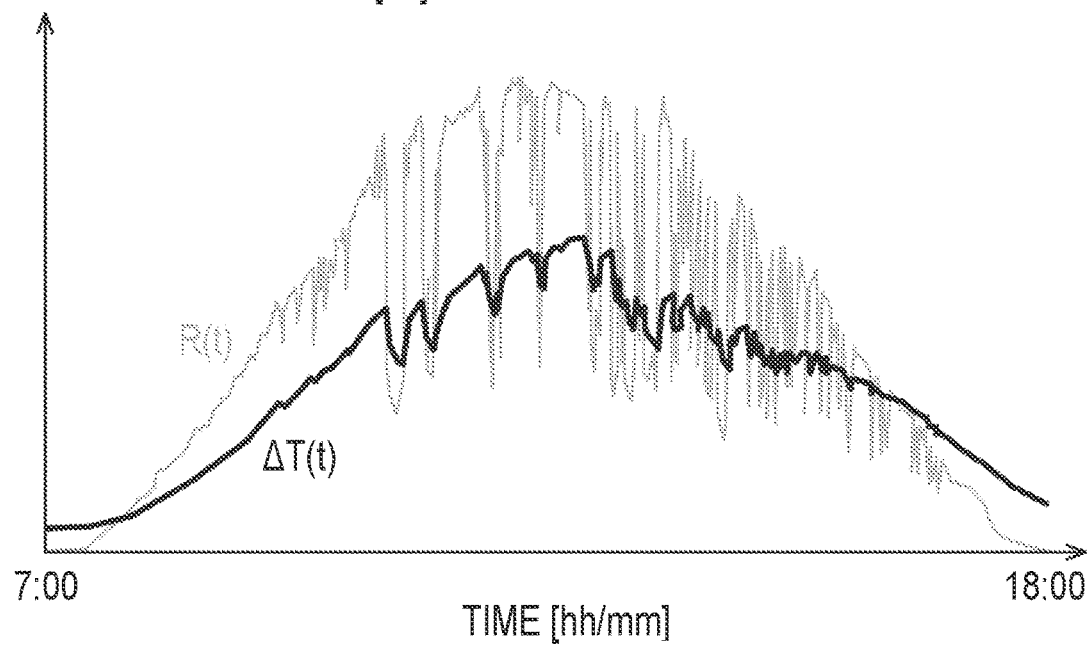
FIG. 5 is a graph of an example of a temperature variation of the target ECU.

FIG. 5 shows an example of the temperature variation ΔT(t)[° C.] of the target ECU 50 between sunrise time 7:00 and sunset time 18:00, which is estimated by the temperature estimator 26. When the temperature estimator 26 estimates the temperature variation of the target ECU 50, the process proceeds to step S206.

Step S206

Figure 6:
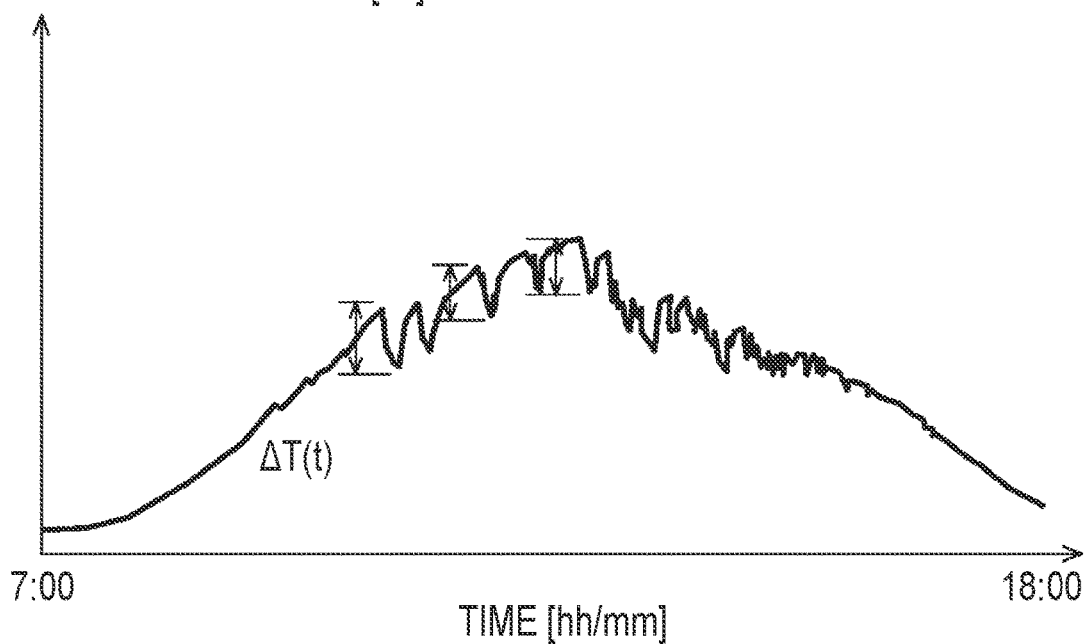
FIG. 6 is a graph for describing a temperature variation range of the target ECU.

The temperature estimator 26 of the solar ECU 20 derives a temperature variation range and the number of the temperature variations based on the temperature variation of the target ECU 50. As shown in FIG. 6, the temperature variation range can be, for example, a temperature range from a maximum value to a minimum value in the temperature variation of the target ECU 50. The temperature range from the minimum value to the maximum value may be used as the temperature variation range. Further, the number of the temperature variations is the number for a plurality of temperature ranges extracted by a set of respective maximum and minimum values in a divided predetermined range.

FIG. 7 shows an example of a correspondence table between the temperature variation range and the number of the temperature variations of the target ECU 50 derived by the temperature estimator 26. In FIG. 7, the temperature variation range of the target ECU 50 is divided into four sections (ΔT1 to ΔT4) according to the temperature range, and for each section, the number of the temperature variations, which is the number for the temperature variation range corresponding to the section, and an average temperature, which is the average value in the temperature variation range corresponding to the section, are derived. The number of sections is merely an example, and is not limited to the number of sections shown in FIG. 7.

Then, the temperature estimator 26 stores the derived temperature variation range and the number of the temperature variations of the target ECU 50 in the storage 27 or the like. In this case, the temperature estimator 26 integrates the temperature variation range and the number of the temperature variations of the target ECU 50, which are derived in this time, with the past temperature variation range and the number of the temperature variations of the target ECU 50, which have been derived so far, and stores the integrated values. When the temperature estimator 26 derives and stores the temperature variation range and the number of the temperature variations of the target ECU 50, the process proceeds to step S207.

Step S207

The communicator 28 of the solar ECU 20 determines whether or not the ignition of the vehicle is turned on (IGCT-ON). When the communicator 28 determines that the ignition of the vehicle is turned on (Yes in step S207), the process proceeds to step S208. On the other hand, when the communicator 28 determines that the ignition of the vehicle is not turned on (No in step S207), the determination of step S207 is repeated.

Step S208

The communicator 28 of the solar ECU 20 transmits, for each target ECU 50, the temperature variation range and the number of the temperature variations (stored in the storage 27) derived by the temperature estimator 26 for the target ECU 50, as information about the temperature variation of the target ECU 50 through the communication bus 70. On the other hand, the communicator 51 of the target ECU 50 receives information about the temperature variation addressed to the communicator 51 itself through the communication bus 70. When the information about the temperature variation of the target ECU 50 is transmitted and received between the communicator 28 and the communicator 51, the process proceeds to step S209.

Step S209

The deterioration estimator 52 of the target ECU 50 calculates a thermal stress amount, which is an integrated amount of stress related to the temperature variation that the target ECU 50 has received, based on the temperature variation range and the number of the temperature variations included in the information about the temperature variation, which is received by the communicator 51 from the solar ECU 20. The thermal stress amount is a numerical representation of the state of deterioration of the target ECU 50. The thermal stress amount N is obtained by the following equation [3] from the average temperatures T1 to T4 and the number of temperature variations M1 to M4 in the respective sections ΔT1 to ΔT4 of the temperature variation range by using a predetermined acceleration factor AF.

$$N = \Sigma(Tx \times Mx) \times AF\{x=1 \text{ to } 4\} \quad [3]$$

When the thermal stress amount received by the target ECU 50, which indicates the state of deterioration of the target ECU 50, is calculated by the deterioration estimator 52 based on the temperature variation range and the number of the temperature variations, the process proceeds to step S210.

Step S210

The deterioration estimator 52 of the target ECU 50 determines whether or not the calculated thermal stress amount received by the target ECU 50 exceeds a second threshold value. That is, the deterioration estimator 52 determines whether or not the state of deterioration of the target ECU 50 reaches a predetermined state. The second threshold value corresponding to the predetermined state is, in other words, an upper limit of the allowable range of stress, and may be set to any value based on an endurance stress amount or the like obtained from a factor of the temperature variation related to the life of the target ECU 50 (solder joint life and the like).

When the deterioration estimator 52 determines that the thermal stress amount applied to the target ECU 50 exceeds the second threshold value (Yes in step S210), the process proceeds to step S211. On the other hand, when the deterioration estimator 52 determines that the thermal stress amount applied to the target ECU 50 does not exceed the second threshold value (No in step S210), the deterioration estimation process ends.

In addition to the temperature variation due to the amount of solar radiation received by the vehicle which is estimated by the solar ECU 20, examples of the temperature variation related to the life include a temperature variation due to the outside air temperature of the vehicle, a temperature variation due to exhaust heat from components mounted around the target ECU 50, and a temperature variation due to self-heating of the target ECU 50. Therefore, in addition to the temperature variation due to the amount of solar radiation received by the vehicle, the deterioration estimator 52 may further calculate the thermal stress amount received by the target ECU 50 based on at least one of the temperature variation due to the outside air temperature of the vehicle, the temperature variation due to exhaust heat from components mounted around the target ECU 50, or the temperature variation due to self-heating of the target ECU 50 to estimate the deterioration of the target ECU 50. Which temperature variation dominates the deterioration can be determined from the mounting position of the target ECU 50 in the vehicle.

Step S211

The notifier 53 of the target ECU 50 gives a notification that the target ECU 50 has deteriorated. The notification is made, for example, to a vehicle user or a maintenance worker as diagnostic data. The notification can prompt replacement of the target ECU 50 nearing the end of the life or the like, for example, when a large heat load is applied to the target ECU 50 earlier than assumed at the time of vehicle design. When the notifier 53 gives the notification that the target ECU 50 has deteriorated, the deterioration estimation process ends.

In the deterioration estimation process according to the above-described embodiment, after the temperature estimator 26 derives and stores the temperature variation range and the number of the temperature variations of the target ECU 50 (step S206), a determination is made as to whether the ignition of the vehicle is turned on (IGCT-ON) (step S207). However, even during the process until the temperature variation range and the number of the temperature variations of the target ECU 50 (steps S201 to S205) are derived, the information about the temperature variation, which includes temperature variation range and number of the temperature variations of the target ECU 50 stored in the storage 27 at the time when the IGCT-ON of the vehicle is determined, may be transmitted and received between the solar ECU 20 and the target ECU 50.

Action and Effect

As described above, with the solar system 1 according to the embodiment of the present disclosure, the solar ECU 20 estimates the temperature variation received by the target ECU 50, which is one of the in-vehicle components, based on the electric power generated by the solar panel 10. The deterioration estimator 52 (deterioration estimation device) of the target ECU 50 estimates deterioration of the target ECU 50 based on information about the estimated temperature variation acquired from the solar ECU 20.

In this way, the solar ECU 20 can accurately acquire a large amount of data needed to determine the state of deterioration based on the electric power generated by the solar panel 10, and thus the target ECU 50 can estimate the deterioration of the target ECU itself with higher precision based on the acquired data. Therefore, the solar system 1 according to the present embodiment can grasp the stress caused by the temperature variation in each area of the vehicle due to unforeseen market use cases, and thus it becomes easy to predict the life and failure of in-vehicle components such as the target ECU 50 that receives stress.

Further, in the solar system 1 according to the present embodiment, the electric power generated by the solar panel 10 covers the power consumption of the solar ECU 20 needed for the operation for estimating the temperature variation of the target ECU 50. Accordingly, it is possible to suppress power consumption of the auxiliary battery 40 due to an increase in dark current while the vehicle is stopped, and so on and thus it is possible to curb the situation in which the auxiliary battery 40 deteriorates.

Although an embodiment of the present disclosure has been described above, the present disclosure can be regarded as a deterioration estimation device, a method that is executed by the deterioration estimation device, a program for the method, a computer-readable non-transitory storage medium storing the program, a solar system equipped with a deterioration estimation device, a vehicle equipped with the solar system, or the like.

The present disclosure can be used, for example, for estimating deterioration of an in-vehicle component such as an ECU by using electric power generated by a solar panel.

What is claimed is:

1. A deterioration estimation device comprising a first in-vehicle component mounted in a vehicle, and a processor configured to
    acquire information from a second in-vehicle component about a temperature variation of the first in-vehicle component based on electric power generated by a solar panel mounted in the vehicle, and
    estimate deterioration of the first in-vehicle component based on the acquired information about the temperature variation of the first in-vehicle component;
    wherein the information about the temperature variation of the first in-vehicle component is based on an amount of solar radiation with which the vehicle is irradiated, the amount of solar radiation being estimated from the electric power generated by the solar panel;
    wherein the information about the temperature variation of the first in-vehicle component is based on a temperature at a position in the vehicle where the first in-vehicle component is mounted, the temperature being estimated from the amount of solar radiation with which the vehicle is irradiated; and
    wherein the information about the temperature variation of the first in-vehicle component is a temperature variation range and the number of temperature variations of the first in-vehicle component, the temperature variation range and the number of the temperature variations being derived from the temperature at the position in the vehicle where the first in-vehicle component is mounted.

2. The deterioration estimation device according to claim 1, wherein the processor is configured to estimate deterioration of the first in-vehicle component based on at least one of an outside air temperature of the vehicle, exhaust heat from components mounted around the first in-vehicle component, and self-heating of the first in-vehicle component, in addition to the temperature variation range and the number of the temperature variations of the first in-vehicle component.

3. The deterioration estimation device according to claim 1, wherein the processor is configured to give a notification when the estimated state of deterioration becomes a predetermined state.

4. A solar system that is mounted in a vehicle, the solar system comprising:
    a solar panel;
    a first in-vehicle component that controls electric power generated by the solar panel; and
    a second in-vehicle component that receives information about a temperature variation from the first in-vehicle component, wherein:
    the first in-vehicle component is configured to
        measure the electric power generated by the solar panel,
        estimate a temperature variation of the second in-vehicle component based on the measured electric power generated by the solar panel, and
        transmit information about the estimated temperature variation of the second in-vehicle component to the second in-vehicle component; and
    the second in-vehicle component is configured to
        receive the information about the temperature variation of the second in-vehicle component from the first in-vehicle component, and
        estimate deterioration of the second in-vehicle component based on the received information about the temperature variation of the second in-vehicle component;
    wherein the information about the temperature variation of the first in-vehicle component is based on an amount of solar radiation with which the vehicle is irradiated, the amount of solar radiation being estimated from the electric power generated by the solar panel;
    wherein the information about the temperature variation of the first in-vehicle component is based on a temperature at a position in the vehicle where the first in-vehicle component is mounted, the temperature being estimated from the amount of solar radiation with which the vehicle is irradiated; and
    wherein the information about the temperature variation of the first in-vehicle component is a temperature variation range and the number of temperature variations of the first in-vehicle component, the temperature variation range and the number of the temperature variations being derived from the temperature at the position in the vehicle where the first in-vehicle component is mounted.

5. The solar system according to claim 4, wherein the first in-vehicle component is configured to
    estimate an amount of solar radiation with which the vehicle is irradiated from the electric power generated by the solar panel,
    estimate a temperature at a position in the vehicle where the second in-vehicle component is mounted from the amount of solar radiation with which the vehicle is irradiated, and
    derive a temperature variation range and the number of temperature variations of the second in-vehicle component from the temperature at the position in the vehicle where the second in-vehicle component is mounted.

6. A vehicle that is equipped with the solar system according to claim 4.

7. A method that is executed by a computer of a first in-vehicle component mounted in a vehicle, the method comprising:
    acquiring information from a second in-vehicle component about a temperature variation of the first in-vehicle component based on electric power generated by a solar panel mounted in the vehicle; and
    estimating deterioration of the first in-vehicle component based on the acquired information about the temperature variation of the first in-vehicle component;
    wherein the information about the temperature variation of the first in-vehicle component is based on an amount of solar radiation with which the vehicle is irradiated, the amount of solar radiation being estimated from the electric power generated by the solar panel;
    wherein the information about the temperature variation of the first in-vehicle component is based on a temperature at a position in the vehicle where the first in-vehicle component is mounted, the temperature being estimated from the amount of solar radiation with which the vehicle is irradiated; and wherein the information about the temperature variation of the first in-vehicle component is a temperature variation range and the number of temperature variations of the first in-vehicle component, the temperature variation range and the number of the temperature variations being derived from the temperature at the position in the vehicle where the first in-vehicle component is mounted.

* * * * *